United States Patent Office 3,652,655
Patented Mar. 28, 1972

3,652,655
PREPARATION OF ESTERS OF UNSATURATED CARBOXYLIC ACIDS
Donald M. Fenton, Anaheim, Calif., assignor to Union Oil Company of California, Los Angeles, Calif.
No Drawing. Filed Oct. 10, 1969, Ser. No. 865,489
Int. Cl. C07c 67/00
U.S. Cl. 260—486 AC
16 Claims

ABSTRACT OF THE DISCLOSURE

The invention comprises the carbonylation of a hydrocarbon olefin by contacting the olefin and carbon monoxide with a carbonyl compound in the presence of a Group VIII noble metal catalyst to produce an ester of an unsaturated carboxylic acid. A typical process comprises contacting ethylene and carbon monoxide with butanal in a liquid medium containing a palladium catalyst to produce butyl acrylate, a valuable polymerization monomer.

DESCRIPTION OF THE INVENTION

The invention relates to a method for the preparation of esters of mono-unsaturated carboxylic acids. More particularly, the invention relates to a method for preparing the esters by reacting an ethylenically unsaturated hydrocarbon with carbon monoxide and a carbonyl compound.

My U.S. Pat. 3,397,225 describes a method of producing esters of unsaturated carboxylic acids by contacting an olefin with carbon monoxide and an alcohol under oxidative conditions in the presence of a platinum group metal. To maintain unsaturation in the product ester a hydrogen of the olefin is released and oxidized to acid or water. Hence, the type of reaction disclosed is commonly termed an "oxidative" carbonylation. A redox agent and, in a preferred embodiment, oxygen, may be employed to elevate the reduced platinum group metal to its higher oxidation state for further reaction in the process.

As will be seen from the following, the process of the present invention utilizes a carbonyl compound, i.e., an aldehyde or ketone, rather than an alcohol and it has been found that, contrary to the process of the patent, a redox agent and/or oxygen are not required for the manufacture of an ester of an unsaturated acid from an olefin. The reaction of the invention proceeds generally as follows:

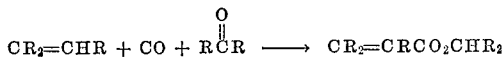

It can be seen from the above reaction that since a hydrogen of the olefin need not be released and oxidized to balance the equation, the Group VIII noble metal is not reduced and the process need not be conducted in the presence of a redox agent or oxygen. The inclusion of such components, however, may be found preferable in some instances because the Group VIII noble metal may be reduced by undesirable side reactions which may occur under some conditions.

The process can be conducted under relatively mild conditions, e.g., temperatures from 50°–300° C. and pressures from atmospheric to 100 atmospheres absolute and is generally conducted in the liquid phase. It is preferable to conduct the reaction under anhydrous conditions, e.g., wherein the reaction medium or vapor stream contains less than 20 weight percent, preferably less than 10 weight percent water, to avoid unnecessary side reactions.

The reactant carbonyl compound may be any of the active aldehydes or ketones, preferably an aldehyde, having 2 to 20 carbons, preferably 2 to 12 carbons, and having the following formula:

wherein R is hydrogen or the same or different alkyl.

Examples of useful aldehydes are ethanal, butanal, pentanal, hexanal, heptanal, octanal, undecanal, eicosanal, 4-ethylhexanal, 3-butylnonanal, 4-ethyl-5-pentyldecanal, etc.

Examples of useful ketones are dimethyl ketone, methyl ethyl ketone, methyl butyl ketone, diheptyl ketone, dioctyl ketone, didecyl ketone, diisobutyl ketone, 3-butylheptyl ethyl ketone, etc.

The reactant hydrocarbon olefin has 2 to about 16 carbons, preferably from 2 to about 10 carbons and has the following general structure:

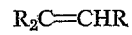

wherein R is hydrogen or the same or different alkyl.

Examples of useful olefins are ethylene, propylene, butene, pentene, hexene, heptene, octene, 2-methylhexene, dodecene, tetradecene-3, 3-ethyldecene-1, etc. Alpha olefins are preferred and are exemplified by ethylene, propylene, butene-1, pentene-1, hexene-1, heptene-1, octene-1, nonene-1, decene-1, undecene-1, 3-ethyldecene-1, 2-methyltetradecene-1, etc.

The catalyst of the invention is a Group VIII noble metal, e.g., ruthenium rhodium, palladium, osmium, iridium or platinum, preferably rhodium or palladium. A catalytic quantity of the metal is utilized, e.g., 0.002–2% of the reaction medium, and the metal may be added as a soluble salt (halide, $C_1$–$C_{20}$ carboxylate, nitrate, sulfate, etc.), a carbonyl, an acid, a hydride, or as a chelate.

Examples of suitable sources of the noble metals are as follows: iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platininic acid, platinous iodide, sodium hexachloroplatinate, potassium trichloro(ethylene) platinate(II), chloropentaaminorhodium(III) chloride, rhodium dicarbonyl chloride dimer, rhodium carbonyl hydride, ruthenium trichloride, tetraaminorutheniumhydroxychloro chloride; etc. Generally the halide salt and particularly the chloride salt are preferred sources of the Group VIII noble metal e.g., palladium chloride, rhodium chloride, etc.

The process of the invention may be performed in the presence of a biphyllic ligand which forms a complex with the Group VIII noble metal. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise trivalent arsenic, antimony, phosphorus or bismuth bonded to various organic radicals such as alkyl, cycloalkyl and aryl hydrocarbons and esters, ethers, amines, etc., as disclosed, for example, in U.S. Pat. 3,035,088 to Slaugh. I prefer to utilize the hydrocarbons with the above metals and of these, the phosphorus compounds, i.e., the phosphines, are preferred. In general, the preferred biphyllic ligands have the following structure:

wherein E is trivalent phosphorus, arsenic, antimony or bismuth; and wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc. and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, etc.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300% of that stoichiometrically required to form a complex with the Group VIII metal). The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc., may be but need not be included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide or bromide, or at least one $C_1$–$C_5$ carboxylate, e.g., acetate, propionate, butyrate, etc., since these groups, particularly halide, have been shown to improve the activity of the catalyst.

The process of the invention may be conducted under liquid phase conditions in the presence of a suitable organic liquid, preferably a ligand which is a solvent for the reactants and catalyst and inert thereto. Suitable liquids include the hydrocarbons, acids, esters, or ethers, which are exemplified by hexane, heptane, octane, benzene, toluene, cyclohexane, cyclodecane, acetic acid, propionic acid, decanoic acid, benzoic acid, butyl ether, methyl tolyl ether, di-iso-amyl ether, methyl acetate, ethyl acetate, etc.

The reaction can also be conducted in the liquid phase without using the above solvents when the reactant carbonyl compound and/or olefin is a liquid under the reaction conditions simply by using an excess of one or both of these reactants, e.g., 2–100 times that stoichiometrically required for the reaction. This can be accomplished, for example, in the batch process, by terminating the reaction prior to most of the carbonyl compound and/or olefin being consumed or, for example, in the continuous process by adding sufficient carbonyl compound and/or olefin to maintain the desired excess.

The reaction may be performed at moderate conditions, e.g., at temperatures of 50°–300° C., preferably 80°–200° C. and at pressures from 1 to 100 atmospheres absolute, preferably 5 to 60 atmospheres. The desired pressure may be maintained by adding an inert gas, e.g., nitrogen to the reaction mixture. In most instances, the pressure of the reactant olefin, if a gas, and/or carbon monoxide is sufficient to maintain the aforementioned pressures.

The process can be performed batchwise or in a continuous fashion. When operating batchwise, the catalyst, the reaction medium, the olefin, if a liquid, and the reactant carbonyl compound can be introduced into the reaction zone to form a liquid phase therein and the reaction zone can be pressured with carbon monoxide and heated to the desired reaction temperature. When the olefin or carbonyl reactant is a gas, it can be added with the carbon monoxide or at any time prior to the heating of the reaction medium. When performing the reaction in a continuous fashion the liquid components can be charged to the reaction zone to form a liquid phase therein and the carbonyl compound, olefin and carbon monoxide continuously introduced into the reaction zone to contact the reaction medium containing the catalyst.

As was stated earlier, a redox agent and/or oxygen may be added to the reaction medium to maintain the Group VIII noble metal in a higher valency state. In general, the redox agent may be any multivalent metal salt having an oxidation potential more positive than the Group VIII noble metal. Typical redox agents are the soluble salts of copper, iron, manganese, cobalt, mercury, nickel, cerium, uranium, bismuth, chromium, molybdenum, etc. Of these the cupric and ferric salts are preferred and cupric salts are most preferred. The anion of the salt may be a $C_1$–$C_8$ carbonylate, halide, nitrate, sulfate, etc., preferably halide, e.g., chloride, bromide, iodide, fluoride. Typical redox agents are cupric chloride, cupric bromide, cupric nitrate, cupric sulfate, cupric acetate, ferric chloride, ferric sulfate, nickel bromide, etc. Preferably, the redox agent is a cupric halide, preferably cupric chloride. The redox agent and/or oxygen, if utilized, is preferably continuously added to the reaction medium throughout the run.

The gaseous reactants can be withdrawn as a separate effluent, cooled, depressured and the non-condensibles, chiefly carbon monoxide, can be recycled to further contacting. The liquid product can be withdrawn separately from the reaction zone by withdrawing a stream of the liquid reaction medium contained therein and the desired saturated ester product recovered by conventional separation processing such as distillation. The catalyst and any unreacted aldehyde or ketone, or olefin may be recycled to the reaction medium.

EXAMPLE 1

The following example illustrates the practice of the invention and demonstrates the results actually obtained:

To a one-half gallon stirred autoclave was added one gram palladium chloride bis(triphenylphosphine), 3 grams triphenylphosphine, one gram lithium chloride and 400 milliliters butanal. The autoclave was pressured with ethylene to about 27 atmospheres and then with carbon monoxide to about 55 atmospheres. The mixture was then heated to and maintained at about 125° C. for 2 hours and at about 175° C. for an additional 2 hours. The liquid contents of the autoclave were removed and analyzed to reveal that butyl acrylate was formed in the process.

To the autoclave were added 1.5 grams palladium chloride bis(triphenylphosphine), 5 grams triphenylphosphine, 100 milliliters butanal and 400 milliliters of acetic acid. The autoclave was pressured to about 20 atmospheres with ethylene and to about 55 atmospheres with carbon monoxide. The mixture was heated to and maintained at 175° C. for 2 hours. The liquid contents of the autoclave were removed and analyzed to reveal that butyl acrylate was formed.

EXAMPLE 2

The following example illustrates other modes of practice presently contemplated.

To a stirred autoclave may be added one gram rhodium chloride, 6 grams tritolyl stibine, 400 milliliters of dibutyl ketone and 50 milliliters of octene-1. The autoclave is purged with nitrogen and pressured with carbon monoxide to 30 atmospheres. The mixture is heated to and maintained at about 200° C. for 5 hours while being stirred. The liquid contents of the autoclave may be removed and nonylnonenoate separated by distillation.

To the autoclave may be added 2 grams iridium-acetate, 500 milliliters of 3-ethylhexanal, and 200 milliliters of 4-propylundecene-2. The autoclave is pressured with carbon monoxide to 30 atmospheres and heated to and maintained at 300° C. for 6 hours while being stirred. The liquid contents are removed to recover 4-ethylhexyl-5-propyldocenoate.

To the autoclave may be added one gram palladium chloride, 200 milliliters of ethyl isobutyl ketone and 200 milliliters of heptene-1. The autoclave may be pressured with carbon monoxide to 25 atmospheres and heated to and maintained at 250° C. for two hours. The liquid contents are removed and 3-isobutylpropyloctenoate recovered therefrom by distillation.

I claim:
1. A process for the preparation of an ester of a mono-unsaturated carboxylic acid comprising contacting a hydrocarbon olefin having from 2 to about 16 carbons and having the structure:

$$CR_2=CHR$$

wherein R is hydrogen or the same or different alkyl, with a co-reactant selected from the class consisting of an aldehyde and ketone having from 2 to about 30 carbons and having the structure:

$$R'-\overset{O}{\underset{\|}{C}}-R'$$

wherein R' is the same or different substituent selected from hydrogen or alkyl,
and with carbon monoxide in the presence of a Group VIII noble metal in complex association with a biphyllic ligand having the formula $$ER''_3$$

wherein E is trivalent phosphorus, arsenic, antimony, or bismuth and wherein R'' is the same or different alkyl having 1 to 10 carbons, cycloalkyl having 4 to about 10 carbons and aryl having 6 to about 10 carbons,
at a temperature between about 50° and 300° C. and a pressure between about 1 and 100 atmospheres.

2. The process of claim 1 wherein said co-reactant is an aldehyde.

3. The process of claim 1 wherein said olefin is an alpha olefin.

4. The process of claim 1 wherein said Group VIII noble metal is palladium or rhodium.

5. The process of claim 1 wherein said Group VIII noble metal is palladium.

6. The process of claim 1 wherein said olefin is an alpha olefin and said aldehyde or ketone is an aldehyde.

7. The process of claim 5 wherein said biphyllic ligand is a triarylphosphine.

8. The process of claim 6 wherein said olefin is ethylene.

9. The process of claim 7 wherein said aldehyde is butyraldehyde, said triarylphosphine is triphenylphosphine and said Group VIII noble metal is palladium or rhodium.

10. The process defined in claim 1 wherein a redox agent comprising a multivalent metal salt having an oxidation potential more positive than said Group VIII noble metal is present during said contacting to maintain the Group VIII noble metal in a high valency state.

11. The process of claim 10 wherein said biphyllic ligand is a triarylphosphine.

12. A process for the preparation of an ester of a mono-unsaturated carboxylic acid comprising contacting a hydrocarbon olefin having from 2 to about 10 carbons having the structure:

$$R_2C=CHR$$

wherein R is the same or different substituent selected from hydrogen or alkyl;
with a ketone having 2 to about 30 carbons and having the structure:

$$R'-\overset{O}{\underset{\|}{C}}-R'$$

wherein R' is the same or different alkyl;
and with carbon monoxide in the presence of a Group VIII noble metal in complex association wth a biphyllic ligand having the formula:

$$E(R'')_3$$

wherein E is trivalent phosphorus, arsenic, antimony, or bismuth and wherein

R'' is the same or different alkyl having from 1 to 10 carbons, cycloalkyl having from 4 to about 10 carbons and aryl having from 6 to 10 carbons;
said contacting being conducted at a temperature between about 50° and 300° C. and a pressure of about 1 and 100 atmospheres.

13. The process of claim 12 wherein said Group VIII noble metal is palladium.

14. The process of claim 12 wherein said biphyllic ligand is a triarylphosphine.

15. The process defined in claim 12 wherein a redox agent comprising a multivalent metal salt having an oxidation potential more positive than said Group VIII noble metal is present during said contacting to maintain the Group VIII noble metal in a high valency state.

16. The process defined in claim 15 wherein said redox agent is a cupric or ferric chloride.

References Cited

UNITED STATES PATENTS 3,427,344   2/1969   Tsuji et al. _____ 260—486 AC

FOREIGN PATENTS 1,221,224   7/1966   Germany _____ 260—497 A
1,227,023   10/1966  Germany _____ 260—497 A

OTHER REFERENCES

Tsuji et al., Organic Syntheses XXXIV JACS./90:1, Jan. 3, 1968.

LORRAINE A. WEINBERGER, Primary Examiner

R. D. KELLY, Assistant Examiner

U.S. Cl. X.R.

260—410.9 R